(12) United States Patent
Suto et al.

(10) Patent No.: US 7,381,470 B2
(45) Date of Patent: Jun. 3, 2008

(54) POLYSILOXANE FILM AND PROCESS FOR PRODUCING THE SAME

(75) Inventors: Michitaka Suto, Odawara (JP); Dimitris Elias Katsoulis, Tokyo (JP); Nobuo Kushibiki, Fujisawa (JP)

(73) Assignee: Dow Corning Toray Co., Ltd., Tokyo (JP)

( * ) Notice: Subject to any disclaimer, the term of this patent is extended or adjusted under 35 U.S.C. 154(b) by 208 days.

(21) Appl. No.: 10/516,840

(22) PCT Filed: Jun. 5, 2003

(86) PCT No.: PCT/JP03/07154

§ 371 (c)(1),
(2), (4) Date: May 16, 2005

(87) PCT Pub. No.: WO03/104329

PCT Pub. Date: Dec. 18, 2003

(65) Prior Publication Data

US 2005/0227091 A1    Oct. 13, 2005

(30) Foreign Application Priority Data

Jun. 5, 2002 (JP) .............................. 2002-164194
Jun. 5, 2002 (JP) .............................. 2002-164195

(51) Int. Cl.
*B32B 9/04* (2006.01)
(52) U.S. Cl. ...................... 428/447; 428/450; 528/15; 528/31; 528/32; 427/296
(58) Field of Classification Search ............... None
See application file for complete search history.

(56) References Cited

U.S. PATENT DOCUMENTS

| 3,313,773 | A  |   | 4/1967  | Lamoreaux |         |
|-----------|----|---|---------|-----------|---------|
| 4,269,753 | A  |   | 5/1981  | Mine et al. |       |
| 4,557,887 | A  | * | 12/1985 | Ona et al. | 264/216 |
| 4,701,017 | A  |   | 10/1987 | Kookootsedes et al. | |
| 5,739,948 | A  | * | 4/1998  | Kushibiki et al. | 359/321 |
| 5,830,950 | A  | * | 11/1998 | Katsoulis et al. | 525/477 |
| 6,358,615 | B1 | * | 3/2002  | Imai | 428/447 |
| 2003/0171477 | A1 |   | 9/2003  | Baba et al. | |

FOREIGN PATENT DOCUMENTS

| EP | 0 215 122 | | 3/1987 |
| EP | 0732373 A1 | | 9/1996 |
| JP | 52-86985 A | * | 7/1977 |
| JP | 61-167408 | | 7/1986 |
| JP | 04-020570 A | * | 1/1992 |
| JP | 8-143776 | | 6/1996 |
| JP | 8-323857 | | 12/1996 |
| JP | 11-147956 | | 6/1999 |
| JP | 2001-138340 | | 5/2001 |
| WO | WO 01/74927 | | 10/2001 |

OTHER PUBLICATIONS

Definition of the word "film" taken from Hawley's Condensed Chemical Dictionary, 14th edition.*
English language Abstract for JP8143776 extracted from espacenet.com database dated Mar. 17, 2005.
English language Abstract for JP8323857 extracted from espacenet.com database dated Mar. 17, 2005.
English language Abstract for JP11147956 extracted from espacenet.com database dated Mar. 17, 2005.
English language Abstract for JP2001138340 extracted from espacenet.com database dated Mar. 17, 2005.
European Search Report for EP03733299 dated Apr. 2, 2007, 3 pages.
Jones, Darrell, "Factors Affecting The Selection And Performance Of Silicone Release Coatings", Dow Corning (1997) pp. 1-24.
Noll, Walter "Chemistry and Technology of Silicones", Academic Press Inc., New York 1968, pp. 400-405.

* cited by examiner

*Primary Examiner*—Marc S. Zimmer
(74) *Attorney, Agent, or Firm*—Howard & Howard Attorneys, P.C.

(57) ABSTRACT

The present invention relates to a film made from a cross-linked polysiloxane obtained by subjecting a polysiloxane that has a specific chemical structure and contains at least two unsaturated aliphatic hydrocarbon groups in one molecule and an organosilicon compound with at least two hydrogen atoms directly bonded to silicon atoms in one molecule to cross-linking reaction in the presence of a platinum-type catalyst.

The film provided by the invention possesses superior heat-resistant properties, has excellent permeability for light in the visible wavelength range, is characterized by low birefringence, and demonstrates physical properties suitable for practical application. By forming an inorganic substance layer on the aforementioned polysiloxane, it is possible to use the laminated film of the invention, e.g., as a transparent electrode film.

17 Claims, 1 Drawing Sheet

FIGURE 1

A...RELATIONSHIP BETWEEN FILM THICKNESS AND
   RESISTANCE AT Sub/ITO UNHEATING
B...TRANSMISSION FACTOR
C...WAVELENGTH

POLYSILOXANE FILM AND PROCESS FOR PRODUCING THE SAME

TECHNICAL FIELD OF THE INVENTION

The present invention relates to a self-supporting polysiloxane film, and more specifically, to an optically transparent polysiloxane film of superior heat endurance. Specifically, the present invention provides a polysiloxane film that can be used as a transparent electrode film, a TFT electrode film, or a film used for other optoelectronis elements; it can also be used for wavelength filters, polarizers, and other optical elements, or as an electronics material of superior heat endurance and insulating properties. The aforementioned polysiloxane film may/or may not have an inorganic layer.

BACKGROUND OF THE INVENTION

In recent years, lightweight transparent polymer films have been extensively used in the field of displays, as can be seen in the example of cellular phone displays. In addition, polymer films are considered to be one of the indispensable constituent elements of conventional paper displays.

Currently known films, which constitute one of the most suitable technological fields for polymer materials, include various films of polyethylene, polypropylene, polyethylene terephthalate, and other crystalline polymeric films as well as films of polycarbonate, polymethylmethacrylate, and other amorphous polymers. All of the above-mentioned materials are thermoplastic polymers that readily lend themselves to use in the production of various types of films by adjusting their molecular weight and molecular weight distribution.

Many of the currently commercially available transparent polymer films are made of thermoplastic polymers and are manufactured, for instance, by calendering molten thermoplastic polymers or by means of extrusion molding them using a T-die. In addition, transparent films can be produced by biaxially stretching crystalline polymers.

Films made from thermoplastic polymers are known to be prone to molecular chain orientation that results from the method of their manufacturing.

In the case of transparent films, such orientation phenomena present a particularly serious problem. This is because birefringence that results from light passing through a transparent film whose molecular chains have been oriented causes polarization of light. Therefore, in terms of their practical application as optical materials, thermoplastic polymer-based transparent films have been viewed as problematic.

Although the orientation of thermoplastic polymers is caused by the stress applied thereto in the molten state, the application of a certain amount of stress during molding in the molten state is impossible to avoid. Therefore, in order to suppress the orientation of the film, it is a good idea to select a molding treatment that does not produce stress, such as, for instance, cast molding with the use of a solvent. However, cast molding requires that a casting solution be prepared by dissolving a mixture of a thermoplastic polymer with various additives such as a UV absorption agent, antioxidant, etc.

Known in the art are thermoplastic amorphous polymers of high thermal resistivity, such as polysulfone. However, a light-absorption band may exist in polysulfones approximately up to 400 nm, and from this point of view, this polymer cannot be easily obtained with high optical transmissivity.

On the other hand, in the case of thermosetting resins, molding does not need application of pressure since liquid monomers or low-molecular-weight prepolymers are subject to cross-linking and increase in molecular weight. This prevents orientation of polymer molecular chains.

Normally, films made from thermosetting resins are supplied in shapes that can be maintained by being supported on appropriate substrates, and in many cases is it is quite difficult to obtain a self-supporting film that is not intended for being maintained on a substrate.

Polysiloxanes can be produced in the form of transparent films that possess superior thermal stability, UV ray stability, anti-oxidation stability, etc. without addition of heat-resistance stabilizers, UV absorbents, anti-oxidants, or the like. However, they are intended for being supported by substrates, and self-supporting polysiloxane films having sufficient physical properties are still absent on the market.

DISCLOSURE OF THE INVENTION

It is an object of the invention to provide a self-supporting polysiloxane film that is characterized by excellent permeability to light in a visible wavelength range, low birefringence, and physical properties suitable for practical application. It is another object of the invention to provide a laminated film that consists of a transparent layer made from the aforementioned polysiloxane film and a layer of an inorganic material placed onto the aforementioned transparent layer.

The object of the present invention is attained by providing a polysiloxane film consisting of a polysiloxane obtained by crosslinking a polysiloxane having an unsaturated aliphatic hydrocarbon group in one molecule and represented by the average structural formula: (1) $R^1_a SiO_{(4-a)/2}$ (where $R^1$ is a $C_1$~$C_{10}$ monovalent hydrocarbon group and the subscript <<a>> is a positive number in the range of 0<a<2) (hereinafter referred to as the "polysiloxane of the above-mentioned average structural formula (1)") with an organosilicon compound having, in each molecule, at least two hydrogen atoms directly bonded to silicon atoms (hereinafter referred to as the "above-mentioned organosilicon compound"); crosslinking being carried out in the presence of a platinum catalyst.

The polysiloxane film of the present invention can be produced by following the steps of: forming an uncured film by coating a substrate with a film-forming crosslinkable polysiloxane composition comprising the polysiloxane of the above-mentioned average structural formula (1), the above-mentioned organosilicon compound, and a platinum catalyst; obtaining a cured film by crosslinking the above-mentioned uncured film; and peeling off the above-mentioned cured film from the above-mentioned substrate.

The polysiloxane of the above-mentioned average structural formula (1) may consists of $(XR^2_2 SiO_{1/2})$ units (where X is a $C_2$~$C_{10}$ monovalent unsaturated aliphatic hydrocarbon group and $R^2$ is independently a $C_1$~$C_{10}$ monovalent hydrocarbon group other than X) and $(R^3 SiO_{3/2})$ units (where $R^3$ is a $C_1$~$C_{10}$ monovalent hydrocarbon group other than X) as essential constitutional units.

Furthermore, the polysiloxane of aforementioned structural formula (1) may consist of $(R^4_n SiO_{(4-n)/2})$ units (where $R^4$ is independently a group selected from a $C_1$~$C_{10}$ monovalent hydrocarbon group and a $C_2$~$C_{10}$ monovalent unsaturated aliphatic hydrocarbon group; and <<n>> is 1, 2, or 3) and $(SiO_{4/2})$ units and contain an unsaturated aliphatic hydrocarbon group in one molecule.

One example of the polysiloxane of the aforementioned average structural formula (1) is a polysiloxane that consists of $(XR^2_2SiO_{1/2})$ units (where X and $R^2$ are the same as defined above) and $(R^3SiO_{3/2})$ units (where $R^3$ is the same as the one defined above). Methods of manufacturing of such a polysiloxane are also known. For example it can be produced by subjecting $R^3SiCl_3$ to hydrolysis and causing a reaction between the hydrolysis product and a compound having an $XR^2_2Si$ group, e.g., an $XR^2_2SiOSiR^2_2X$ disiloxane.

Another example of the polysiloxane of aforementioned average structural formula (1) is a polysiloxane that consists of $(R^4_nSiO_{(4-n)/2})$ units (where $R^4$ and "n" are the same as defined above) and $(SiO_{4/2})$ units and that contains unsaturated aliphatic hydrocarbon groups in one molecule. Methods of manufacturing such a polysiloxane are also known. For example it can be produced by introducing $(R^4_3SiO_{1/2})$ units (n=3) into a product of hydrolysis and condensation of an orthosilicate and a tetraalkoxysilane (that contains $SiO_{4/2}$ units) due to reaction thereof with a compound having $R^4Si$ groups, such as $R^4SiCl$, $R^4SiOSiR^4_3$, etc. (in this case, in the initial stage the reaction is carried out with a compound having $R^4_3Si$ groups without unsaturated aliphatic hydrocarbon groups and then, for introduction of unsaturated aliphatic hydrocarbon groups, with a compound having $R^4_3Si$ groups that contains the aforementioned unsaturated aliphatic hydrocarbon groups). Furthermore, $(R^4_3SiO_{1/2})$ units (n=3) and $(R^4_2SiO)$ units (n=2) can be introduced by reacting the aforementioned products of hydrolysis and condensation with a compound that contain $R^4_3Si$ groups, such as $R^4_3SiCl$, $R^4_3SiOSiR^4_3$, etc. Similarly, $(R^4SiO_{3/2})$ units (n=1) can be introduced by reacting the aforementioned products of hydrolysis and condensation with $R_4SiCl_3$ or its derivatives.

The polysiloxane film of the present invention possesses self-supporting properties, does not have a specific light absorption band in the visible range and has an optical transmissivity of not less than 85% at 400 nm and an optical transmissivity of not less than 88% in the wavelength range of from 500 nm to 700 nm.

Thus, the object of the present invention is accomplished by providing a laminated film formed by depositing an inorganic layer onto a transparent layer made from the aforementioned polysiloxane film. Preferably, the inorganic layer is formed from a vapor-deposited metal or a semiconductor metal oxide. For example, the aforementioned inorganic layer may be formed by vapor deposition in vacuum at a temperature not exceeding 300° C., preferably not exceeding 250° C.

DETAILED DESCRIPTION OF THE INVENTION

The crosslinkable polysiloxane composition used in the production of the polysiloxane film of the present invention is comprised of the polysiloxane of the above-mentioned average structural formula (1), the above-mentioned organosilicon compound, and a platinum catalyst as indispensable components.

The polysiloxane of the above-mentioned average structural formula (1) used in the present invention comprises $C_1$~$C_{10}$, preferably, $C_1$~$C_6$, and even more preferably, $C_1$ or $C_2$ monovalent saturated hydrocarbon groups and/or $C_2$~$C_{10}$, preferably, $C_2$~$C_8$, and even more preferably, $C_2$~$C_6$ and especially $C_2$~$C_4$ monovalent unsaturated hydrocarbon groups (both types of groups are designated as $R^1$ in the above-mentioned average structural formula (1)). The $C_2$~$C_{10}$ unsaturated hydrocarbon groups are made up of $C_2$~$C_{10}$ unsaturated aliphatic hydrocarbon groups and $C_6$~$C_{10}$ aromatic hydrocarbon groups, but the polysiloxane of the above-mentioned average structural formula (1) of the present invention should necessarily contain in one molecule at least two such unsaturated aliphatic hydrocarbon groups.

Methyl, ethyl, n-propyl, isopropyl, n-butyl, isobutyl, sec-butyl, tert-butyl, pentyl, hexyl, heptyl, octyl, nonyl, decyl and other alkyl groups are suggested as the $C_1$~$C_{10}$ saturated hydrocarbon groups. Methyl is preferable from the standpoint of the heat endurance and other properties of the polysiloxane.

Vinyl, 1-propenyl, allyl, isopropenyl, 1-butenyl, 2-butenyl, and other alkenyl groups are suggested as the $C_2$~$C_{10}$ unsaturated aliphatic hydrocarbon groups. Vinyl is preferable from the standpoint of the crosslinking reactivity and other properties of the polysiloxane.

Phenyl, tolyl, xylyl, etc. are suggested as examples of the $C_6$~$C_{10}$ aromatic hydrocarbon groups. Phenyl is preferable from the standpoint of the heat endurance and other properties of the polysiloxane.

The polysiloxanes of the above-mentioned average structural formula (1) used in the present invention include polysiloxanes comprising trifunctional units and monofunctional units as well as polysiloxanes consisting of tetrafunctional units and monofunctional units. In addition, as far as the polysiloxanes of the above-mentioned average structural formula (1) are concerned, the use of bifunctional units is not particularly excluded and, depending on the purpose and intended use, bifunctional units may also be used. However, generally speaking, although the introduction of bifunctional units into polysiloxane leads to increased flexibility of the resultant film, it also brings about a decrease in the thermal deformation temperature of the film and thereby creates an important factor that affects its shape, which is why the content of bifunctional units is limited to a range in which the effects of the present invention are not impaired.

Qualitatively, it can be appreciated that the flexibility of the polysiloxane film of the present invention increases as the distance between crosslinking points becomes longer and its brittleness increases as the distance between crosslinking points becomes shorter. In order to reduce the distance between crosslinking points it is preferable to select low molecular weight compounds as the polysiloxanes of the above-mentioned average structural formula (1) and compounds having as many silicon-bonded hydrogen atoms as possible as the above-mentioned organosilicon compounds. On the other hand, in order to increase the distance between crosslinking points, it is preferable to choose high molecular weight compounds as the polysiloxanes of the above-mentioned average structural formula (1) and compounds having as few silicon-bonded hydrogen atoms as possible as the above-mentioned organosilicon compounds. In this manner, the mechanical properties of the polysiloxane film of the present invention can be controlled by appropriately selecting the number of hydrogen atoms in the above-mentioned organosilicon compound and the molecular weight of the polysiloxane of the above-mentioned average structural formula (1).

The polysiloxane of the above-mentioned average structural formula (1) may consists of $(XR^2{}_2SiO_{1/2})$ units (where X and $R^2$ are the same as defined above) and $(R^3SiO_{3/2})$ units (where $R^3$ is the same as defined above), or $(R^4{}_n SiO_{(4-n)/2})$ units (where $R^4$ and <<n>> are the same as defined above) and $(SiO_{4/2})$ units as essential constitutional units. This polysiloxane also contains in its molecule unsaturated aliphatic hydrocarbon groups. Molecular weights and mole ratios of the aforementioned structural units may vary in wide ranges and may be freely selected provided that the optical transmissivity is not less than 85% at 400 nm, and is not less than 88% in the wavelength range of from 500 nm to 700 nm, and that the tensile strength of the film is not less than 10 MPa.

There are no particular limitations concerning the above-mentioned organosilicon compounds used in the present invention so long as these are compounds containing, in each molecule, two or more hydrogen atoms directly bonded to silicon atoms; it is preferable to use compounds possessing compatibility with the polysiloxanes of the above-mentioned average structural formula (1) in the presence of organic solvents or in the absence thereof. The above-mentioned organosilicon compounds can be either synthesized using typical means employed in the pertinent technical field or obtained commercially.

Specific examples of the above-mentioned organosilicon compounds are provided below:

(1) Methylsilane, dimethylsilane, phenylsilane, diphenylsilane, phenylmethylsilane, phenyltris(dimethylsiloxy)silane, and other silane-based organosilicon compounds;

(2) 1,2-bis(dimethylsilyl)benzene, 1,3-bis(dimethylsilyl)benzene, 1,4-bis(dimethylsilyl)benzene, and other aromatic organosilicon compounds;

(3) $Me_3SiO$-$(Me_2SiO)_m$-$(MeHSiO)_n$—$SiMe_3$ (where <<m>> is an integer of 0 or 1 or greater and <<n>> is an integer of 2 or greater) and other methylhydrogenpolysiloxanes having both ends of the molecular chain blocked by trimethyl groups;

(4) $HMe_2SiO$-$(Me_2SiO)_p$-$(MeHSiO)_q$—$SiMe_2H$ (where the subscripts <<p>> and <<q>> are independently 0 or integers of 1 or greater), for instance, 1,1,3,3,5,5,7,7-octamethyltetrasiloxane, and other methylhydrogenpolysiloxanes capped with hydrogen atoms at both ends of the molecular chain;

(5) $Me_3SiO$-$(PhMeSiO)_m$-$(MeHSiO)_n$—$SiMe_3$, $Me_3SiO$-$(PhMeSiO)_m$-$(PhHSiO)_n$—$SiMe_3$ (where the subscript <<m>> is 0 or an integer of 1 or greater and the subscript <<n>> is an integer of 2 or greater) and other methylphenylhydrogenpolysiloxanes having both ends of the molecular chain blocked by trimethyl groups;

(6) $HMe_2SiO$-$(PhMeSiO)_p$-$(MeSiHO)_q$—$SiMe_2H$, $HMe_2SiO$-$(PhMeSiO)_p$-$(PhSiHO)_q$—$SiMe_2H$, $HMe_2SiO$-$[(Me_2HSiO)PhSiO]_p SiMe_2H$ (where the subscripts <<p>> and <<q>> are independently 0 or integers of 1 or greater) and other methylphenylhydrogenpolysiloxanes capped with hydrogen atoms at both ends of the molecular chain;

(7) $(Me_2SiO)_m(MeHSiO)_n$, $(PhMeSiO)_m(PhHSiO)_n$, $(PhMeSiO)_m(MeHSiO)_n$ (where <<m>> is 0 or an integer of 1 or greater and <<n>> is an integer of 2 or greater), for instance, phenylhydrocyclosiloxane (3- or 4-mers) and other cyclic polysiloxanes;

(8) Bis[(p-dimethylsilyl)phenyl]ether and other ether-type organosilicon compounds;

(9) $PhSi(OSiMe_2H)_{1.5}O_{0.75}$, $PhSi(OSiMe_2H)_2O_{0.5}$, $PhSi(OSiMe_2H)_{2.5}O_{0.25}$, $PhSi(OSiMe_2H)_{1.7}(OMe)_{0.06}O_{0.62}$, $\{(HMe_2SiO)_3SiC_6H_4\}_2$, $(HMe_2SiO)_3SiC_6H_4Si(OSiMe_2H)_3$ and other organosilicon compounds;

(10) Silicone resin compounds comprising $R^5{}_b R^6{}_c SiO_{(4-b-c)/2}$ units (where $R^5$ is Me or Ph, $R^6$ is H, the subscript <<b>> is an integer in the range of 0 to 2, the subscript <<c>> is an integer in the range of 1 to 3, and <<b+c>> is an integer of 3 or less) (where the compounds comprise at least two atoms of hydrogen per molecule), etc. (in all the formulas above, Me represents methyl and Ph represents phenyl).

Theoretically, if the mole ratio of the silicon-bonded hydrogen atom of the above-mentioned organosilicon compound to the unsaturated aliphatic hydrocarbon group in the polysiloxane of the above-mentioned average structural formula (1) is 1:1, both the polysiloxane of the above-mentioned average structural formula (1) and the above-mentioned organosilicon compound are supposed to react completely, but in reality a certain amount does not react and remains in the material as residue.

The amount of unsaturated aliphatic hydrocarbon groups remained after cross-linking can be as much as possible reduced by increasing the amount of silicon-bonded hydrogen atoms as compared to the unsaturated aliphatic hydrocarbon groups. Thus, it becomes possible to reduce deterioration that may be caused by ultraviolet rays oxygen and, hence, to improve optical transmissivity. However, using an excessive amount of the organosilicon compound relative to the polysiloxane of the above-mentioned average structural formula (1) causes problems in terms of reaction efficiency and in other respects. In the film-forming crosslinkable polysiloxane composition of the present invention, the above-mentioned organosilicon compound is usually combined with the polysiloxane of the above-mentioned average structural formula (1) such that the number of hydrogen atoms directly bonded to silicon atoms contained in the above-mentioned organosilicon compound is equivalent to or greater than the number of the aliphatic unsaturated groups contained in the polysiloxane of the above-mentioned average structural formula (1). However, because unreacted residual silicon-bonded hydrogen atoms may react with moisture to produce silanol groups, the amount of the above-mentioned organosilicon compound has to be kept within certain limits to prevent the generation of silanol groups, with account taken of the intended use of the film-forming crosslinkable polysiloxane composition. The amount of the above-mentioned organosilicon compound can be varied between 10 and 120 parts by mass per 100 parts by mass of the polysiloxane of the above-mentioned the average structural formula (1), on the condition that the molar ratio of the hydrogen atoms of the above-mentioned organosilicon compound to the aliphatic unsaturated groups of the polysiloxane of the above-mentioned average structural formula (1) is 1:1 or greater, preferably 1.1~1.5.

For optical material applications, it is particularly desirable for the polysiloxane film of the present invention to be transparent in the visible wavelength range. In order to increase the transparency of the polysiloxane film of the present invention, it is necessary to provide that the hydrocarbon groups bonded to the aforementioned organosilicon compound and the hydrocarbon groups other than those of the unsaturated aliphatic hydrocarbon groups of the polysiloxane of average structural formula (1) be as much as possible the same. For example, when the polysiloxane of the above-mentioned average structural formula (1) contains mainly phenyl groups as the $R^1$ groups, it is recommended that the above-mentioned organosilicon compound should similarly have phenyl groups directly bonded to silicon atoms.

Any platinum catalyst normally used for the hydrosilation reaction and in the crosslinking of silicone rubber can be utilized as the platinum catalyst added to the film-forming crosslinkable polysiloxane composition of the present invention. Examples of such platinum catalysts include platinum chloride, chloroplatinic acid, platinum-olefin complexes, platinum-phosphine complexes, platinum-vinylsiloxane complexes, etc. Addition-reaction catalysts represented by known palladium-compound catalysts and rhodium-compound catalysts also may be used for the same purpose. There are no particular limitations concerning the amount of the platinum catalyst added, which is, for instance, approximately 0.000001~3 wt %, as converted to platinum metal, relative to the total weight of the crosslinkable polysiloxane composition, or approximately 0.5~100 ppm, as converted to platinum metal, relative to the total amount of the polysiloxane of the above-mentioned average structural formula (1) and the above-mentioned organosilicon compound, and depending on the specific ingredients of said composition, the amount of the added catalyst can be appropriately increased or reduced.

In addition to the above-mentioned essential ingredients, the crosslinkable polysiloxane composition of the present invention may contain optional additives intended to impart the film with the desired physical properties, for instance, various fillers, fibers, etc. that are commonly compounded with polysiloxanes.

For instance, when a high optical transparency is not required of the film, the strength of the film can be improved by adding common particulate additives, such as silica (including fumed silica and colloidal silica), alumina, and other inorganic particles as additives. The amount of the inorganic particles, which may also vary depending on the target physical properties and specific application, may be determined on the basis of simple compounding tests.

Additionally, even if inorganic particles are added, the transparency of the film can be preserved by adjusting the particle size of said particles. The increase in the opacity of the film due to the particulate additives is caused by light scattering due to the particulate additives and varies depending on the refractive index of the material of the particles; however, in general, selecting particles with a diameter of ⅕~⅙ of the wavelength of the incident light (that in the range of visible light corresponds to 80 to 60 nm), makes it possible to suppress scattering and maintain the transparency of the film.

Secondary aggregation of particles may also constitute a serious source of light scattering. The secondary aggregation may be restricted by subjecting the particle to surface treatment.

Phthalocyanine-based colorants, conventional fluorescent materials, and other dyes and pigments can be also added to the present crosslinkable polysiloxane composition used for polysiloxane film manufacture. In particular, since the polysiloxane film of the present invention does not have a specific absorption in the visible range, it is possible to functionalize the polysiloxane film of the present invention by using additives that absorb visible light and carry out specific functions as a result of photo-excitation.

Next, explanations are provided regarding the production process used for the polysiloxane film of the present invention.

The polysiloxane film of the present invention can be obtained by means of film molding using a crosslinkable polysiloxane composition containing the polysiloxane of the above-mentioned average structural formula (1), the above-mentioned organosilicon compound, and a platinum catalyst. Specifically, during film molding, a series of operations is carried out that involves forming an uncured film by coating the aforementioned crosslinkable polysiloxane composition on a substrate, crosslinking and curing said uncured film, and peeling off the cured film from said substrate.

The above-mentioned crosslinkable polysiloxane composition for film molding can be prepared by dissolving the polysiloxane of the above-mentioned average structural formula (1), the above-mentioned organosilicon compound, and the platinum catalyst in a solvent of the manufacturer's choice. The amount of the solvent added may be, for instance, in the range of from 1 part by mass to 300 parts by mass per 100 parts by mass of the polysiloxane composition for film molding, but it is not limited to this range. In the process of crosslinking the temperature may sometimes reach as high as 200° C. or so, and thus there are no particular limitations with regard to the solvents used so long as the solvents have a boiling point of not more than 200° C. and are capable of dissolving polysiloxanes. The solvents may be exemplified by acetone, methylethylketone, or other ketones; benzene, toluene, xylene, or other aromatic hydrocarbons; heptane, hexane, octane, and other aliphatic hydrocarbons; dichloromethane, chloroform, methylene chloride, 1,1,1-trichloroethane, or other halogenated hydrocarbons; THF, or other ethers; dimethylformamide, N-methyl pyrrolidone, or other organic solvents.

As follows from the above, in order to reduce as much as possible the amount of unsaturated aliphatic hydrocarbon groups that remain after cross-linking and thus to improve the optical transmissivity, UV-resistant properties, acid-resistant properties, etc., it is preferable to control the amount of the added organosilicon compound and the polysiloxane of the aforementioned average structural formula (1) in the aforementioned crosslinkable polysiloxane composition for film molding such that the amount of hydrogen atoms in the organosilicon compound is slightly in excess relative to the amount of the unsaturated aliphatic hydrocarbon groups in the polysiloxane of the aforementioned average structural formula (1).

Although there are no particular limitations regarding the substrate so long as it has excellent peelability and a smooth surface, the material has to be stable to the essential components of the crosslinkable polysiloxane composition, i.e. the polysiloxane of the aforementioned formula (1), the aforementioned organosilicon compound, and the platinum catalyst, as well as to the solvents and additives used when said composition contains solvents or additive. In addition, it must exhibit resistance in the temperature environment used for the crosslinking reaction of the uncured film. Glass, graphite, and other inorganic substances, iron, stainless steel, and other metallic materials, or stable polymeric materials that are not dissolved in the solvents used for cast molding even at boiling points of such solvents, can be used as the substrate materials.

The crosslinking (curing) of the uncured film can be carried out by heating said film to room temperature or a higher temperature. There are no particular limitations concerning the temperature, to which it is heated, so long as it is room temperature or higher, for instance, a temperature of 40° C. to 200° C. The heating-induced hydrosilation-type addition reaction between the polysiloxane of the aforementioned average formula (1) and the aforementioned organosilicon compound is catalyzed by the aforementioned platinum catalyst. If necessary, the method of heating employed can be appropriately modified. For example, heating can be done in multiple short spurts, or continuously over an extended period of time.

Additionally, in order to improve workability by adjusting platinum catalyst-dependent reactivity during crosslinking and curing, 2-methyl-3-butyn-2-ol, dimethylmaleate, dimethylfumarate, bis(2-methoxy-1-methylethyl)maleate, 1-ethynyl-1-cyclohexanol, 3,5-dimethyl-1-hexyn-3-ol, N,N,N',N'-tetramethylethylenediaamine, ethylenediamine, diphenylphosphine, diphenylphosphate, trioctylphosphine, diethylphenylphosphonite, methyldiphenylphosphinite, and other cure retarders can be added in advance to the crosslinkable polysiloxane composition as reaction controllers.

A film cured on a substrate by means of crosslinking can be obtained by peeling from the substrate using peeling means well-known in this technical field. Mechanical separation means utilizing, for instance, doctor blades, vacuum suction, etc., can be used as the peeling means. The thickness of the polysiloxane film of the present invention, which can be appropriately changed depending on the intended use, is typically between 5 and 200 µm or greater.

The thus produced polysiloxane film of the present invention, unlike films produced by the cast molding of ordinary thermosetting resins, is a self-supporting substrate-independent film. In addition, the polysiloxane film of the present invention does not have a specific light absorption band in the visible range and has an optical transmissivity of not less than 85% at 400 nm and an optical transmissivity of not less than 88% in the wavelength range of from 500 nm to 700 nm.

Also, the polysiloxane film of the present invention is problem-free in terms of polymer chain orientation because it is produced without applying stress in a molten state. For this reason, birefringence is so low that it can be ignored.

The polysiloxane film of the present invention is obtained by polymerization as a result of an addition-type crosslinking reaction taking place between the unsaturated aliphatic hydrocarbon groups of the polysiloxane of the aforementioned average structural formula (1) and hydrogen atoms directly bonded to silicon atoms in the aforementioned organosilicon compound. In such an addition-type crosslinking reaction, low molecular weight by-products are not generated during crosslinking, and for this reason crosslinking-induced reduction in the volume of the film is suppressed and made smaller in comparison with the condensation-type crosslinking reaction seen in ordinary thermosetting resins. For this reason, the internal stress in the resultant film is lower in the case of polysiloxane films obtained by the addition-type crosslinking reaction. Therefore, in the polysiloxane film of the present invention, the generation of strain caused by the internal stress is suppressed. Additionally, this positively contributes to an increase in the strength and an increase in the optical uniformity of the film.

In addition, even if heated to 300° C., the polysiloxane film of the present invention maintains its shape and exhibits no changes in weight. In addition, it exhibits superior mechanical properties after heating, there being almost no change before and after heating in terms of the mechanical properties of the polysiloxane film of the present invention. Therefore, the polysiloxane film of the present invention possesses the high heat endurance characteristic of polycarbonates and other widely-used engineering plastics and can be suitably employed in technical fields requiring heat endurance.

As has been mentioned above, the laminated film of the invention is provided with an inorganic layer placed onto the above-described cross-linked polysiloxane film.

The transparent layer that constitutes a substrate of the laminated film of the invention may be comprised of a single layer of the cross-linked polysiloxane. If necessary, however, the substrate may be comprised of a laminated body composed of a plurality of individual cross-linked polysiloxane films, or may be composed of a cross-linked polysiloxane film laminated with a transparent film or sheet of another type.

Since, in general, polymer films possess flexibility and electrical insulation properties, they are suitable for use as substrates for films of many other types. For example, the polymeric film substrates may support a-Si {H} (amorphous silicon), p-Si (polycrystalline silicon), transparent electrode substances, or other film-formed electrode elements; wavelength-dividing filters for optical communication, band filters, or filters of other types; antireflective films made from antireflective film materials; gas-barrier films formed by depositing silica on film substrates, etc.

Since the cross-linked polysiloxane used in the present invention is a polymer that possesses heat-resistant properties, has low hydroscopicity, and constitutes a cross-linked body, evaporation of low-molecular-weight components during vacuum film formation will not inflict damage to the film.

In other words, the laminated film of the present invention that consists of a transparent layer made from a cross-linked polysiloxane film that does not have a specific absorption band in the wavelength range of 400 to 800 nm (hereinafter referred to simply as a "transparent layer") and an evaporated layer applied onto the aforementioned transparent film and made from an inorganic substance can be produced by a vacuum film-forming process in which the temperature of the transparent layer that forms the substrate does not exceed 300° C. Such temperature conditions are needed to protect the transparent layer of the film from deformation or decomposition. From this point of view, it is more preferable to maintain the transparent layer at a temperature below 250° C.

There is no special restriction with regard to inorganic material provided that they can be deposited by evaporation. Normally such materials are metals, metal-oxide semiconductors, or the like. These materials may be exemplified by $SiO_2$, $ZnO$, $In_2O_3$, ITO (Indium-Tin-Oxide: $In_2O_{3-x}Sn$), NiO, FeO, $Cu_2O$, alumina, tungsten, gold, silver, copper, aluminum, diamond, etc. Thickness of the inorganic layer may depend on the type of the inorganic material, but, in general, it is most appropriate to make this layer with the thickness of 50 to 5000 Angstroms. Since even metals such as, e.g., silver that has an absorption band in the visible light range, can be formed into such thin layers as 50 to 100 Angstroms, it is possible to form from an inorganic material a sufficiently transparent and conductive layer, so that the laminated film produced in accordance with the invention would be suitable for use as a transparent electrode material.

The transparent electrode material is selected from metal-oxide semiconductor substances that have band-gap absorption properties in a shortwave range not exceeding 400 nm and possess high transparency in the visible-light range. Examples of such materials are $SiO_2$, $ZnO$, $In_2O_3$, $SnO_2$, ITO, or other metal-oxide semiconductors.

The vacuum film forming processes suitable for manufacturing laminated films of the present invention may be exemplified by thermal CVD, plasma CVD, MOCVD, or other methods involving formation of a film from a gaseous phase, as well as deposition processes in which a target is used as a source of a film-forming material, ion plating, DC or RF sputtering, etc.

When an inorganic material layer is formed by conventional methods on a polymeric substrate, it is specifically not recommended to use such film-forming processes that generate high-energy oxygen activated by plasma in a film-forming chamber. This is because such oxygen can easily oxidize and decompose organic compounds.

An example of a situation that requires formation of an inorganic layer with the use of oxygen fed to a film-forming chamber is formation of such a layer in a metal-oxide type semiconductor. Typical examples of such semiconductors are $In_2O_3$, ITO ($In_2O_3$-xSn), $SnO_2$, ZnO n-type semiconductors and NiO, FeO, $Cu_2O$ p-type semiconductors.

In the course of the formation of the aforementioned inorganic layers, the film-forming chamber is evacuated and filled with argon at $10^{-4}$ Torr and oxygen at $10^{-5}$ Torr. This is necessary to compensate for the deficiency of oxygen in a metal-oxide type semiconductor, e.g., of an ITO type, and to prevent increase of resistance caused by decrease in concentration of the carrier. It is also possible to adjust resistance of the aforementioned film-type inorganic compound layer by doping. For example, when ZnO is selected as a conductive substance of the layer, it can be doped with In and Al, and when the conductive substance is $SnO_2$, doping can be carried out with the use of Sb and F. Normally, such a method allows adjusting the value of resistance within the range of $1\times10^{-5}$ to $1\times10^{-2}$ Ohm/cm.

Since the transparent layer that constitutes the substrate of the laminated film of the invention exhibits increased resistance to oxygen, it becomes possible to select more appropriate film-forming, doping, and inorganic-layer forming processes.

In view of the fact that due to low surface-tension a polysiloxane has low adhesion, in those cases where adhesion between the inorganic layer and the transparent layer of the laminated film is an essential factor, it is recommend to apply an inorganic substance by ion plating. In this process, ions accelerate molecules in a gaseous phase so that they acquire an increased kinetic energy for collision with the transparent-layer substrate and thus provide stronger attachment of the inorganic substance layer to the transparent substrate.

A laminated film produced by the above-described method did not show a noticeable change in properties after being immersed in boiling water or after heating to 300° C., even in comparison with a laminated film having an inorganic substance layer applied by conventional RF sputtering.

In order to promote crystallization in an inorganic layer formed on a substrate, the inorganic layer can be subjected to annealing. Since the transparent substrate of the present invention does not change its properties after heating even to 300° C., annealing can be carried out at temperature close to 300° C.

When the inorganic substance layer has to be formed as a thin film of a metal sputtered onto the substrate, such a film may be formed from many metals, including precious metals like gold, silver, as well as copper, etc., at temperatures below 300° C.

CVD processes that form an inorganic substance layer on a transparent substrate as a result of decomposition of gas fed to the working chamber do not encounter any problems for application in the method of the invention, provided that these processes are carried out at relatively low temperatures (200 to 250° C.), such as e.g., in the case of plasma CVD. Since pressure in the working chamber is maintained within the range of 0.1 to 1 Torr for argon and hydrogen, 0.01 to 0.1 Torr for $SiH_4$, $Si_2H_6$, or other silane gases, and from several ten to several hundred $mW/cm^2$ for RF power, such pressures are quite sufficient for formation of inorganic film layers on transparent substrates heated from 200 to 250° C.

Thus, the polysiloxane can endure the process temperature, which is one of environmental conditions during formation of the aforementioned film. Since the process does not involve any substances that could affect the polysiloxane under the aforementioned conditions, there are no obstacles for manufacturing the laminated film of the invention in a vacuum film-forming process.

Since in a vacuum film-forming process the transparent layer of the laminated film of the invention is not affected by oxygen, this layer allows deposition of oxygen-containing compounds, e.g., formation of a thin silica coating applied by CVD with the use of tetraethoxysilane, and improves resistance to wear and scratching.

PREFERRED EMBODIMENTS OF THE INVENTION

The invention will be further described with reference to specific practical embodiments, which, however, should not be construed as limiting the scope of the invention.

APPLICATION EXAMPLE 1

0.69 g of 1,4-bis(dimethylsilyl)benzene was added to 4 g of a 75 mass % toluene solution of polysiloxane $[ViMe_2SiO_{0.5}]_{0.25}[PhSiO_{1.5}]_{0.75}$ resin with a GPC-determined molecular weight of approximately 1700 and the mixture was subjected to sufficient agitation.

After that, a complex compound made up of 1,3-divinyltetramethyldisiloxane and chloroplatinic acid was further added thereto so as to set the mass of platinum metal to 2 ppm relative to the solid matter mass of the above-mentioned mixture consisting of the above-mentioned polysiloxane and 1,4-bis(dimethylsilyl)benzene.

After spreading this casting solution on a glass substrate and allowing it to stand for about 1 hour at room temperature, it was cured by heating for about 2 hours at 100° C. and for about 3 hours at 150° C.

After that, it was left standing to allow it to cool down to room temperature and a polysiloxane film was obtained by peeling the cured product from the glass substrate.

The film was transparent and had a thickness of 70 μm. When the optical transmissivity of the film was measured using a Shimadzu spectrophotometer, the 3100PC, the optical transmissivity of the film at 400~700 nm was not less than 85%. Next, the optical transmissivity of the film was measured using a polarizer, but no polarization dependency was observed. In addition, it was confirmed that the film exhibited no birefringence.

Next, the resultant film was cut into strips with a width of 1 cm and a length of 10 cm, after which a Shimadzu tester, the Autograph, was used to measure their tensile strength and Young's modulus under room temperature conditions at a speed of 60 mm/min, with a distance of 60 mm between the benchmark lines. The Young's modulus of the film was 1.5 GPa, and its tensile strength 23 MPa.

APPLICATION EXAMPLE 2

The film produced in Application Example 1 was heated for 2 hours at 200° C. and cooled down to room temperature, whereupon a Shimadzu spectrophotometer, the 3100PC, was used to measure its optical transmissivity, which was not less than 85% at 400~700 nm. Next, the optical transmissivity of the film was measured using a polarizer, but no polarization dependency was observed. In addition, it was confirmed that the film exhibited no birefringence.

Next, the film was cut into strips with a width of 1 cm and a length of 10 cm, after which the Shimadzu Autograph tester was used to measure their tensile strength and Young's modulus under room temperature conditions at a speed of 60 mm/min, with a distance of 60 mm between the benchmark lines. The Young's modulus of the film was 1.5 GPa and its tensile strength was about 23 MPa, i.e. there was no change relative to the properties of the film prior to the heat treatment.

APPLICATION EXAMPLE 3

0.69 g of 1,4-bis(dimethylsilyl)benzene was added to 3 g of polysiloxane $[ViMe_2SiO_{0.5}]_{0.25}[PhSiO_{1.5}]_{0.75}$ resin with a GPC molecular weight of approximately 1700 and the mixture was subjected to sufficient agitation. The resultant mixture was liquid at room temperature.

Subsequently, the same platinum catalyst as the one used in Application Example 1 was added so as to set the mass of platinum metal to 2 ppm relative to the mass of the mixture of the above-mentioned resin and 1,4-bis(dimethylsilyl) benzene, and, furthermore, a hundred times more of 2-methyl-3-butyn-2-ol, in comparison with the mass of platinum metal, was added thereto and the mixture was immediately subjected to agitation.

After spreading the thus obtained mixture on a glass substrate and allowing it to stand for about 1 hour at room temperature, it was cured by heating for about 2 hours at 100° C. and for about 3 hours at 150° C.

Subsequently, it was left standing to allow it to cool down to room temperature and a polysiloxane film was obtained by peeling it from the glass substrate. The resultant film was transparent and had a thickness of 120 μm.

APPLICATION EXAMPLE 4

1.11 g of 1,1,3,3,5,5,7,7-octamethyltetrasiloxane was added to 4.51 g of a 90% toluene solution of polysiloxane $[ViMe_2SiO_{0.5}]_{0.12}[MeSiO_{1.5}]_{0.88}$ resin with a molecular weight of 2700.

Subsequently, the same platinum catalyst as the one used in Application Example 1 was added to the mixture of the above-mentioned resin and 1,1,3,3,5,5,7,7-octamethyltetrasiloxane so as to set the weight of platinum to 2 ppm relative to the weight of the mixture, after which agitation continued until a casting solution was obtained.

After spreading the casting solution on a glass substrate and allowing it to stand for about 1 hour at room temperature, it was cured by heating for about 2 hours at 100° C. and for about 3 hours at 150° C.

Subsequently, it was left standing to allow it to cool down to room temperature and a polysiloxane film was obtained by peeling the cured product from the glass substrate.

Next, the resultant film was cut into strips with a width of 1 cm and a length of 10 cm, after which the Shimadzu Autograph tester was used to measure their tensile strength and Young's modulus under room temperature conditions at a speed of 60 mm min, with a distance of 60 mm between the benchmark lines. The Young's modulus of the film was 1.1 GPa, and its tensile strength 15 MPa.

APPLICATION EXAMPLE 5

Synthesis Example 1

(Synthesis of SiH-containing polysiloxane) 78 g 1,1,3,3-tetramethyldisiloxane, 95 g hexamethyldisiloxane, 48 g ethanol, 59 g water, and 33 mL of 35% concentrated hydrochloric acid were placed in a reactor, cooled to −10° C., and subjected to agitation. After adding 270 g tetraethoxysilane to the mixture in a dropwise manner, it was subjected to hexane extraction, with the extract washed in a saturated aqueous solution of ammonium chloride until neutral, after which it was dried over sodium sulfate. A colorless polymer was obtained by removing the solvent with an aspirator and drying in vacuum. The yield was 84%.

Using gel permeation chromatography, nuclear magnetic resonance spectroscopy, and quantification of hydrogen groups, it was determined that the average compositional formula of the polymer was $(HMe_2SiO_{1/2})_{0.9}(Me_3SiO_{1/2})_{0.9}(SiO_{4/2})$.

Syhthesis Example 2

(Synthesis of vinyl-containing polysiloxane) 50 g 1,3-divinyl-1,1,3,3-tetramethyldisiloxane, 44 g hexamethyldisiloxane, 22 g ethanol, 31 g water, and 16 mL of 35% concentrated hydrochloric acid were placed in a reactor and stirred for 30 minutes at 40~50° C. After adding 125 g tetraethoxysilane to the mixture in a dropwise manner, it was subjected to hexane extraction, with the extract washed in a saturated aqueous solution of ammonium chloride until neutral, after which it was dried over magnesium sulfate. A colorless polymer was obtained by removing the solvent with an aspirator and drying in vacuum. The yield was 92%.

Using gel permeation chromatography, nuclear magnetic resonance spectroscopy, and quantification of hydrogen groups, it was determined that the average compositional formula of the polymer was $(ViMe_2SiO_{1/2})_{0.9}(Me_3SiO_{1/2})_{0.9}(SiO_{4/2})$.

5 g of the SiH-containing polysiloxane of Synthesis Example 1 (SiH groups: 23 moL), 4.5 g of the vinyl-containing polysiloxane of Synthesis Example 2 (SiVi groups: 18.6 mmoL), and the same platinum catalyst as the one used in Application Example 1, in the amount of 5.4 ppm relative to the total weight of the polysiloxane, were added thereto and the mixture was subjected to agitation until a casting solution was obtained.

After spreading the casting solution on a glass substrate and allowing it to stand for about 1 hour at room temperature, it was cured by heating for about 2 hours at 100° C. and for about 3 hours at 150° C.

Subsequently, it was left standing to allow it to cool down to room temperature and a polysiloxane film was obtained by peeling the cured product from the glass substrate.

The spectral transmissivity of the polysiloxane film, as determined using a spectrophotometer from Hitachi, the USP3100, was 30% at 280 nm, 88% at 300 nm, and 92% at 400~700 nm.

APPLICATION EXAMPLE 6

A transparent laminated film was produced in a film-forming chamber by forming an ITO-type transparent layer on the surface of the film obtained in Application Example 1.

More specifically, the layer was formed by RF sputtering using ITO as a target. The chamber was evacuated, concentration of oxygen in the chamber was adjusted to $2 \times 10^{-4}$ Torr, RF power was set to 500 W, the film temperature was maintained at 60° C., and the ITO layer was formed.

Figure 1:
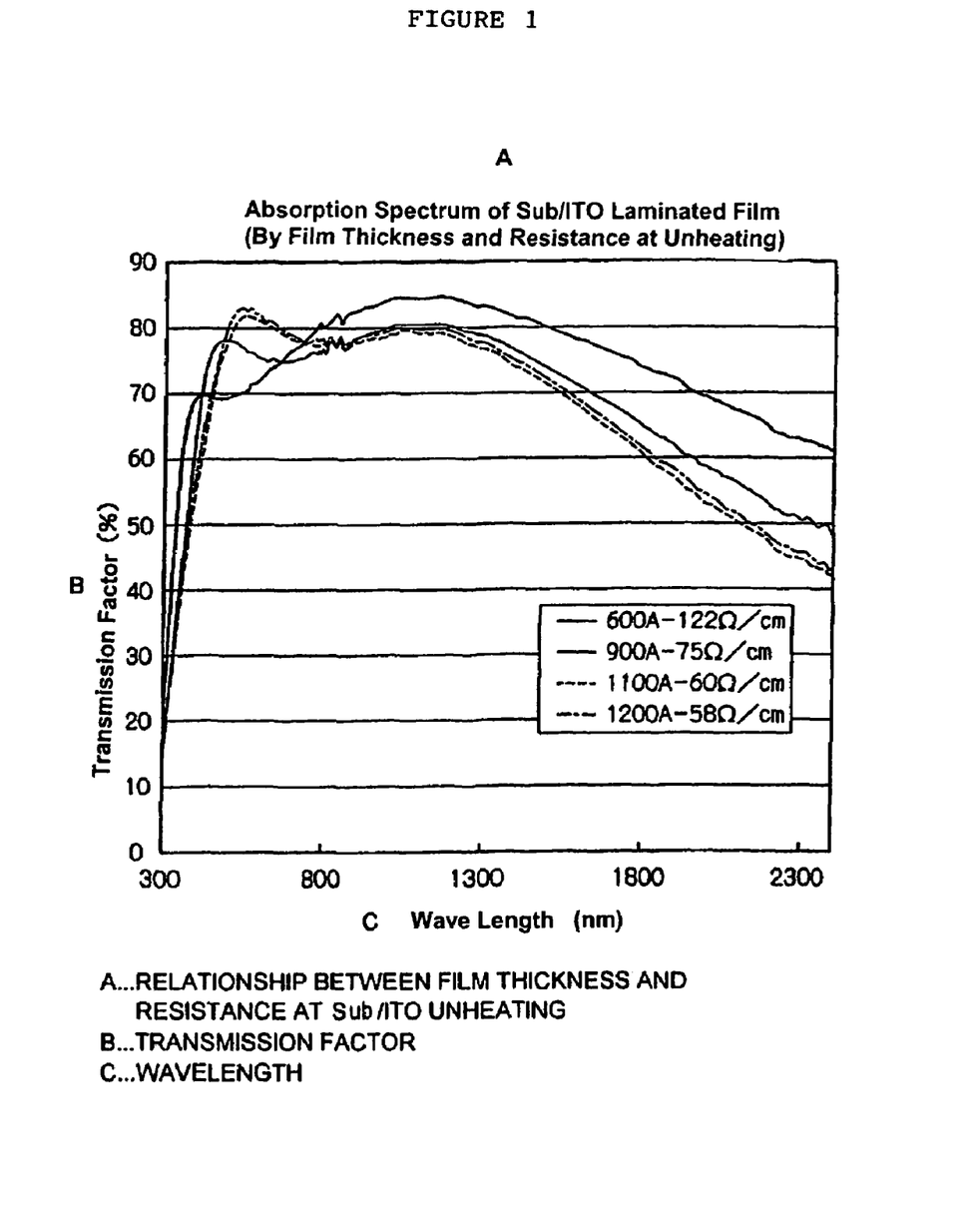
FIG. 1 shows absorption spectra of transparent laminated films of four different types obtained in Practical Example 6 for different durations of inorganic-layer formation steps.

Thickness was adjusted by changing the time during which the inorganic compound layer was formed. Transparent laminated films were produced in four different types. Resistance of the ITO layer and absorption spectra measured with the use of a Shimazu spectrophotometer (Model UV3100PC) were determined in all four transparent laminated films. Results of measurement are shown in FIG. 1.

Absorption spectra were measured for the second time by the same instrument after heating of the film for 2 hours at 150° C. The results did not show any changes in the spectra.

The obtained laminated films were immersed for 2 hours in boiling water, but this did not cause peeling of the inorganic layer. Observations did not reveal any striking changes in appearance or absorption spectra even after heating the film for 16 hours at 200° C.

A transparent laminated film coated with an ITO layer was immersed into a 6N nitric acid. The ITO layer was removed, so that the transparent layer made from the cross-linked polysiloxane film was exposed. However, no changes were observed in the transparent layer, at least in the spectrum of the infrared range measured by an infrared spectrophotometer. Tensile strength of the substrate also remained unchanged. This indicates to the fact that after the processes of the ITO layer formation and etching the transparent layer remains the same as prior to these processes. Thus it can be assumed that electrode patterns also can be formed in the laminated film of the invention.

APPLICATION EXAMPLE 7

A transparent laminated film was produced in a film-forming chamber by forming a thin conductive layer of metal on the film obtained in Application Example 1.

More specifically, the layer was formed by sputtering using gold as a target. The chamber was evacuated, concentration of argon in the chamber was adjusted to 1.3 mbar, and a thin film of gold was formed at 500 V voltage and 8 mA current.

The obtained gold film was sputtered with the use of argon, and an elemental analysis was conducted with use of X-ray photoelectron spectroscopy (XPS) for the material on the interface between the thin gold film and the cross-linked polysiloxane film in contact the aforementioned film. Signals 4f (84.8 eV) corresponding to electrons of gold were negligibly small, while signals Si2p, C1s, and O1s corresponding to electrons of polysiloxane are shown below in Table 1.

TABLE 1

| Si2pEb | I | C1sEb | I | O1sEb | I |
|---|---|---|---|---|---|
| 112.8 | 55 | 281.3 | 39 | 532.1 | 164 |

The obtained data and the waveform peaks were the same as prior to vapor deposition of the layer.

APPLICATION EXAMPLE 8

The film obtained in Application Example 1 was secured to a substrate in the JEOL (JFC 1100) chamber of the sputtering apparatus; pressure in the chamber was reduced to $10^{-6}$ Torr, the chamber was filled with argon at $10^{-4}$ Torr, and then gold was applied by sputtering at 800V and 8 mA. As a result, a thin gold layer having a thickness of about 100 nm was formed on the film. XPS analysis of the gold layer did not reveal peaks other than those corresponding to gold. Immersion of the gold-coated film for 2 hours in hot water at 90° C. did not cause peeling of the coating.

COMMERCIAL APPLICABILITY

Because of its superior physical and mechanical properties, the polysiloxane film of the present invention is self-supporting and can be used as a substrate-independent film. In addition, because it is cross-linked, the polysiloxane film of the present invention exhibits high heat endurance even when heat endurance-imparting additives are not used.

In addition, the polysiloxane film of the present invention is transparent in the visible range and exhibits low birefringence. Another superior characteristic it possesses is that its optical transmissivity exhibits no polarization dependence. For this reason, it is particularly suitable for applications requiring properties such as optical transparency, and, moreover, has excellent optical characteristics suitable for both polarized light and coherent light. Furthermore, by taking advantage of its transparency over a wide range of wavelengths, it can be used in wavelength filters and other optical elements.

In the polysiloxane film of the present invention, the unsaturated aliphatic hydrocarbon groups of the polysiloxane of aforementioned average structural formula (1) are consumed in the process of crosslinking and, as a result, the film does not absorb UV light and exhibits high stability to oxygen. Therefore, the polysiloxane film of the present invention can be subjected to film-forming treatment in the gas phase as well.

In general, when a metal oxide thin layer is formed on a film, it is necessary to perform high energy treatment, such as sputtering, in an oxygen-containing environment, and during such treatment the oxygen is often excited and activated. Therefore, the film has to possess high stability to active oxygen, and the polysiloxane film of the present invention is stable even under such film-forming conditions. Consequently, the polysiloxane film of the present invention can be used in optoelectronic elements, for instance, as a transparent electrode substrate film.

In addition, even when no additives are used, the film is highly heat-resistant and exhibits high resistance to dielectric breakdown, which is an inherent characteristic of cross-linked polysiloxane; for this reason, the polysiloxane film of the present invention can be used in electronics materials requiring high insulating properties, such as, for instance, capacitor films, etc.

The polysiloxane film that is structured as a laminated film of the present invention is permeable not only to light in a visible wavelength range but also to rays in ranges from near-ultraviolet to near-infrared. Birefringence through the film is either absent or extremely small. Therefore, when inorganic layers of the laminated films of the invention are used as transparent electrode materials, they may be included into the structure of electroluminescence displays, liquid-crystal displays, or similar thin-type displays as voltage-receiving electrodes.

Furthermore, the laminated films of the invention can be used as various filters, reflecting plates, or similar film-type optical elements. By adjusting resistance of the inorganic layer, it is possible to utilize the aforementioned films as electric-charge removers, electromagnetic shields, etc.

Since the transparent layer of the laminated film of the invention shows high stability against chemical treatment, the laminated film is suitable for the formation of various electrode patterns by removing portions of the inorganic substance layer by various etching processes.

What we claim is:

1. A self-supporting polysiloxane film, which does not have a specific light absorption band in the visible wavelength range and has an optical transmissivity of not less than 85% at 400 nm and an optical transmissivity of not less than 88% in the wavelength range of from 500 nm to 700 nm, said film comprising a polysiloxane crosslinked by reacting, in the presence of a platinum catalyst, a polysiloxane having an unsaturated aliphatic hydrocarbon group and represented by the average structural formula: (1) $R^1_a SiO_{(4-a)/2}$ (where $R^1$ is a $C_1$–$C_{10}$ monovalent hydrocarbon group and the subscript >>a<< is a positive number in the range of 0<a<2) and wherein the polysiloxane comprises ($R^3SiO_{3/2}$) units (where $R^3$ is a $C_1$~$C_{10}$ monovalent hydrocarbon group other than a $C_2$~$C_{10}$ monovalent unsaturated aliphatic hydrocarbon group) and/or ($SiO_{4/2}$) units with an organosilicon compound having at least two hydrogen atoms directly bonded to silicon atoms.

2. The self-supporting polysiloxane film according to claim 1, in which the polysiloxane represented by the above-mentioned average structural formula (1) comprises ($XR^2_2SiO_{1/2}$) units (where X is a $C_2$~$C_{10}$ monovalent unsaturated aliphatic hydrocarbon group, and $R^2$ is a $C_1$~$C_{10}$ monovalent hydrocarbon group other than X) and the ($R^3SiO_{3/2}$) units.

3. The self-supporting polysiloxane film according to claim 1, in which the polysiloxane represented by the above-mentioned average structural formula (1) comprises ($R^4_nSiO_{(4-n)/2}$) units (where $R^4$ is selected independently from a $C_1$~$C_{10}$ monovalent hydrocarbon group and a $C_2$~$C_{10}$ monovalent unsaturated aliphatic hydrocarbon group, and <<n>> is 1, 2, or 3), and ($SiO_{4/2}$) units, and contains an unsaturated aliphatic hydrocarbon group.

4. A self-supporting polysiloxane film according to claim 1 having a tensile strength of not less than 10 MPa.

5. A self-supporting polysiloxane film according to claim 4 having a thickness of between 5 and 200 m.

6. A method of manufacturing a self-supporting polysiloxane film, which does not have a specific light absorption band in the visible wavelength range and has an optical transmissivity of not less than 85% at 400 nm and an optical transmissivity of not less than 88% in the wavelength range of from 500 nm to 700 nm, said method comprising the steps of:
forming an uncured film by coating a substrate with a crosslinkable polysiloxane composition comprising a polysiloxane having an unsaturated aliphatic hydrocarbon group and represented by the average structural formula: (1) $R^1_aSiO_{(4-a)/2}$ (where $R^1$ is a $C_1$~$C_{10}$ monovalent hydrocarbon group and the subscript a is a positive number in the range of 0<a<2) and wherein the polysiloxane comprises ($R^3SiO_{3/2}$) units (where $R^3$ is a $C_1$~$C_{10}$ monovalent hydrocarbon group other than a $C_2$~$C_{10}$ monovalent unsaturated aliphatic hydrocarbon group) and/or ($SiO_{4/2}$) units, an organosilicon compound having at least two hydrogen atoms directly bonded to silicon atoms, and a platinum catalyst;
producing the self-supporting polysiloxane film by crosslinking the above-mentioned uncured film; and
peeling off the above-mentioned film from the above-mentioned substrate.

7. The method of manufacturing a self-supporting polysiloxane film according to claim 6, wherein the polysiloxane represented by the above-mentioned average structural formula (1) comprises ($XR^2_2SiO_{1/2}$) units (where X is a $C_2$~$C_{10}$ monovalent unsaturated aliphatic hydrocarbon group and $R^2$ is independently a $C_1$~$C_{10}$ monovalent hydrocarbon group other than X) and the ($R^3SiO_{3/2}$) units.

8. The method of manufacturing a self-supporting polysiloxane film according to claim 6, wherein the polysiloxane represented by the above-mentioned average structural formula (1) comprises ($R^4_nSiO_{(4-n)/2}$) units (where $R^4$ is selected independently from a $C_1$~$C_{10}$ monovalent hydrocarbon group and a $C_2$~$C_{10}$ monovalent unsaturated aliphatic hydrocarbon group, the subscript <<n>> is 1, 2, or 3), and ($SiO_{4/2}$) units, and contains an unsaturated aliphatic hydrocarbon group.

9. A laminated film comprising an inorganic substance layer on a transparent substrate made from a self-supporting cross-linked polysiloxane that does not have a specific light absorption band in the wavelength range of 400 nm to 800 nm, wherein the polysiloxane comprises ($R^3SiO_{3/2}$) units (where $R^3$ is a $C_1$~$C_{10}$ monovalent hydrocarbon group other than a $C_2$~$C_{10}$ monovalent unsaturated aliphatic hydrocarbon group) and/or ($SiO_{4/2}$) units.

10. The laminated film of claim 9, wherein said inorganic substance layer is a layer of metal or a semiconductor metal oxide applied by vapor deposition.

11. The laminated film according to claim 9, wherein said crosslinked polysiloxane film is made from a polysiloxane crosslinked by reacting a polysiloxane containing an unsaturated aliphatic hydrocarbon group and represented by the following average structural unit formula (1):

$$R^1_aSiO_{(4-a)/2} \qquad (1)$$

(where $R^1$ is a $C_1$~$C_{10}$ monovalent hydrocarbon group and the subscript <<a>> is a positive number in the range of 0<a<2) and wherein the polysiloxane comprises the ($R^3SiO_{3/2}$ units and/or ($SiO_{4/2}$) units and an organosilicon compound having at least two hydrogen atoms directly bonded to silicon atoms, in the presence of a platinum catalyst.

12. The laminated film according to claim 11, wherein said polysiloxane represented by the above-mentioned average structural formula (1) comprises ($XR^2_2SiO_{1/2}$) units (where X is a $C_2$~$C_{10}$ monovalent unsaturated aliphatic hydrocarbon group and $R^2$ is a $C_1$~$C_{10}$ monovalent hydrocarbon group other than X) and the ($R^3SiO_{3/2}$) units.

13. The laminated film according to claim 11, wherein said polysiloxane represented by the above-mentioned average structural formula (1) comprises ($R^4_nSiO_{(4-n)/2}$) units (where $R^4$ is selected independently from a $C_1$~$C_{10}$ monovalent hydrocarbon group and a $C_2$~$C_{10}$ unsaturated aliphatic hydrocarbon group, the subscript <<n>> is 1, 2, or 3), and ($SiO_{4/2}$) units, and contains an unsaturated aliphatic hydrocarbon group.

14. A laminated film according to claim 9 wherein said transparent substrate has a tensile strength of not less than 10 MPa.

15. A laminated film according to claim 14 wherein said transparent substrate has a thickness of between 5 and 200 m.

16. A laminated film according to claim 15 wherein said inorganic layer has a thickness of 50 to 5000 Angstroms.

17. A method of manufacturing a laminated film by forming an inorganic substance layer in a vacuum film-forming process at a temperature not exceeding 300° C. on a transparent substrate made from a self-supporting cross-linked polysiloxane that does not have a specific light absorption band in the wavelength range of 400 nm to 800 nm.

* * * * *

UNITED STATES PATENT AND TRADEMARK OFFICE
CERTIFICATE OF CORRECTION

PATENT NO. : 7,381,470 B2  
APPLICATION NO. : 10/516840  
DATED : June 3, 2008  
INVENTOR(S) : Michitaka Suto et al.

Page 1 of 1

It is certified that error appears in the above-identified patent and that said Letters Patent is hereby corrected as shown below:

On the Title Page 1, Item (75) Inventors:
  Delete "Odawara" and replace with -- Kanagawa --.
  Delete "Fujisawa" and replace with -- Kanagawa --.

Column 17, line 1, after "subscript" delete ">>a<<" insert therein -- <<a>> --.

Column 17, line 30, delete "☒" insert therein -- µ --.

Column 17, line 45, after "subscript" delete "a" insert therein -- <<a>> --.

Column 18, line 28, after "comprises the" delete "($R_3SiO_{3/2}$)" insert therein -- ($R^3SiO_{3/2}$) --.

Column 18, line 53, delete "☒" insert therein -- µ --.

Column 18, line 61, after "300°" delete "C." insert therein -- C --.

Signed and Sealed this

Thirtieth Day of December, 2008

JON W. DUDAS  
*Director of the United States Patent and Trademark Office*